Patented Oct. 12, 1954

2,691,666

UNITED STATES PATENT OFFICE 2,691,666

PROCESS FOR THE MANUFACTURE OF MONOFERRO-DICALCIUM-CITRATE

Adolf Christian Josef Opfermann, Bergisch-Gladbach, Germany

No Drawing. Application November 20, 1951, Serial No. 257,431

Claims priority, application Germany November 21, 1950

12 Claims. (Cl. 260—439)

This invention relates to a new compound and to a process of manufacturing same, and relates more particularly to the manufacture of monoferro-dicalcium-citrate.

The following ferro-citrates have already been described: ferro-citrate, ferro-ammonium-citrate, ferro-sodium-citrate and ferro-potassium-citrate.

The present invention relates to the manufacture of monoferro-dicalcium-citrate of the formula $Ca_2Fe(C_6H_5O_7)_2$, which is intended for therapeutical purposes, particularly for the treatment of secondary anaemias.

The manufacture is effected by reacting citric acid in an aqueous solution with an iron containing substance and a calcic salt, for instance calcium carbonate or calcium citrate. As iron-containing substances, ferrum reductum, ferro hydroxide or a ferro salt in a volatile acid, particularly ferro carbonate may be used.

Preferably stoichiometrical amounts are used. It is also possible to use an excess of calcic salt and citric acid. As the monoferro-dicalcium-citrate in a moist condition is sensative to oxygen, the atmospheric oxygen must be kept at a distance during the reaction. This is done by the use of a protective gas, for example hydrogen, nitrogen or carbonic acid. The hydrogen or the carbonic acid which are formed during the reaction already provide a certain amount of protection against oxidation. It is, however, expedient to introduce additional protective gases and to continue passing the gases through the reaction solution after the reaction has taken place, until all the water has been removed by distillation. The anhydrous compound is fairly resistant against atmospheric oxygen.

Example 1

2-mol citric acid is dissolved in distilled water, and is in order to expel the oxygen (dissolved air), heated to boiling point for one hour, whilst hydrogen is passed through. Now 1 g-atom ferrum reductum is introduced into the solution and when the formation of hydrogen has abated the speed of the flow of the hydrogen is increased. An acid ferro-citrate is precipitated. By reaction with 2-mol calcium carbonate the monoferro-dicalcium-citrate is formed whilst carbonic acid develops. The water is distilled off by gradual heating of the reaction vessel to 200° whilst simultaneously passing hydrogen through it, whereby a white crystal powder remains.

Example 2

A solution of 2-mol citric acid in water is mixed with one mol ferro hydroxide after expelling the dissolved air by boiling, and the passing through of nitrogen. Acid ferro citrate is formed. Hereafter the solution is mixed with 2-mol calcium carbonate, whereupon monoferro-dicalcium-citrate is formed, whilst carbonic acid develops. The passing through of nitrogen is continued in the course of both reactions, as also until all the water has been removed. The dry, white product obtained shows the following data of analysis;

| Found | Calculated |
| --- | --- |
| 27.0% C | 28.0% C |
| 2.10% H | 1.95% H |
| 10.60% $Fe^{II}$ | 10.85% $Fe^{II}$ |

I claim:

1. As a new compound monoferro-dicalcium-citrate of the formula $Ca_2Fe(C_6H_5O_7)_2$.

2. Process for the manufacture of monoferro-dicalcium-citrate of the formula $Ca_2Fe(C_6H_5O_7)_2$, consisting in reacting citric acid in an aqueous solution with an iron-containing substance selected from the group consisting of iron and inorganic ferrous compounds and a calcium salt in the proportion of at least two moles citric acid: one mole iron: two moles of calcium salt, the water being expelled after the reaction is completed until the completely anhydrous citrate remains.

3. Process for the manufacture of monoferro-dicalcium-citrate of the formula $Ca_2Fe(C_6H_5O_7)_2$, consisting in reacting citric acid in an aqueous solution with ferrum reductum and a calcium salt in the proportion of at least two moles citric acid: one mole ferrum reductum: two moles calcium salt, the water being expelled after the reaction is completed until the completely anhydrous citrate remains.

4. Process for the manufacture of monoferro-dicalcium-citrate of the formula $Ca_2Fe(C_6H_5O_7)_2$, consisting in reacting citric acid in an aqueous solution with ferrous hydroxide and a calcium salt in the proportion of at least two mols citric acid: one mol ferrous hydroxide: two mols calcium salt, the water being expelled after the reaction is completed until the completely anhydrous citrate remains.

5. Process for the manufacture of monoferro-dicalcium-citrate of the formula $Ca_2Fe(C_6H_5O_7)_2$, consisting in reacting citric acid in an aqueous solution with ferrous salts of volatile inorganic acids and a calcium salt in the proportion of at least two mols citric acid: one mol ferrous salt: two mols calcium salt, the water being expelled after the reaction is completed until the completely anhydrous citrate remains.

6. Process for the manufacture of monoferro-dicalcium-citrate of the formula $Ca_2Fe(C_6H_5O_7)_2$, consisting in reacting citric acid in an aqueous solution with ferrous carbonate and a calcium salt in the proportion of at least two mols citric acid: one mol ferrous carbonate: two mols calcium salt, the water being expelled after the reaction is completed until the completely anhydrous citrate remains.

7. Process for the manufacture of monoferro-dicalcium-citrate of the formula $Ca_2Fe(C_6H_5O_7)_2$, consisting in reacting citric acid in an aqueous solution with an iron-containing substance selected from the group consisting of iron and inorganic ferrous compounds and calcium citrate in the proportion of at least two moles citric acid: one mole iron: two moles calcium citrate,, the water being expelled after the reaction is completed until the completely anhydrous citrate remains.

8. Process for the manufacture of monoferro-dicalcium-citrate of the formula $Ca_2Fe(C_6H_5O_7)_2$, consisting in reacting citric acid in an aqueous solution with an iron-containing substance selected from the group consisting of iron and inorganic ferrous compounds, and calcium carbonate in the proportion of at least two moles citric acid: one mole iron: two moles calcium carbonate, the water being expelled after the reaction is completed until the completely anhydrous citrate remains.

9. Process for the manufacture of monoferro-dicalcium-citrate of the formula $Ca_2Fe(C_6H_5O_7)_2$, consisting in reacting citric acid in an aqueous solution with an iron-containing substance selected from the group consisting of iron and inorganic ferrous compounds, and a calcium salt in the proportion of two moles citric acid: one mole iron: two moles calcium salt, the water being expelled after the reaction is completed until the completely anhydrous citrate remains.

10. Process for the manufacture of monoferro-dicalcium-citrate of the formula $Ca_2Fe(C_6H_5O_7)_2$, consisting in reacting citric acid in an aqueous solution with an iron-containing substance selected from the group consisting of iron and inorganic ferrous compounds and a calcium salt in the presence of a protective gas in the proportion of at least two moles citric acid: one mole iron: two moles calcium salt, the water being expelled after the reaction is completed until the completely anhydrous citrate remains.

11. Process for the manufacture of monoferro-dicalcium-citrate of the formula $Ca_2Fe(C_6H_5O_7)_2$, consisting in reacting citric acid in an aqueous solution with an iron-containing substance selected from the group consisting of iron and inorganic ferrous compounds and a calcium salt in the proportion of at least two moles citric acid: one mole iron: two moles calcium salt, the water being expelled with the aid of a current of protective gas after the reaction is completed until the completely anhydrous citrate remains.

12. Process for the manufacture of monoferro-dicalcium-citrate of the formula $Ca_2Fe(C_6H_5O_7)_2$, consisting in reacting citric acid in an aqueous solution with an iron-containing substance selected from the group consisting of iron and inorganic ferrous compounds and a calcium salt in the proportion of two moles citric acid: one mole iron: two moles calcium salt in the presence of a protective gas, the water being expelled after the reaction is completed with the aid of a current of protective gas until the completely anhydrous citrate remains.

References Cited in the file of this patent

UNITED STATES PATENTS

| Number | Name | Date |
|---|---|---|
| 2,081,547 | Mattheus | May 25, 1937 |

OTHER REFERENCES

Harada, Institute of Physical and Chemical Research, Scientific Papers (Tokyo), vol. 41, pages 177–181 (1943)